INVENTOR.
RALPH J. DONALDSON Jr.

United States Patent Office  3,200,397
Patented Aug. 10, 1965

3,200,397
CONSTANT HEIGHT ANTENNA SCAN
Ralph J. Donaldson, Jr., Sudbury, Mass., assignor to the United States of America as represented by the Secretary of the Air Force
Filed Apr. 2, 1963, Ser. No. 270,120
1 Claim. (Cl. 343—7.4)
(Granted under Title 35, U.S. Code (1952), sec. 266)

The invention described herein may be manufactured and used by or for the United States Government for governmental purposes without payment to me of any royalty thereon.

This invention relates to the meteorological analysis of storms, and particularly to the determination of the rain-producing potentialities of an observed storm or cloud mass.

In prior cloud scanning techniques a cloud searching radar signal has been transmitted by causing a transmitting antenna to rotate, through a complete circle of rotation, at one selected angle of antenna elevation; then repeating the scan at progressively varying new angles of antenna elevation, to obtain echo pulses at multiple distances, with the multiple results being correlated in storage and synthesizing apparatus for the purpose of recording (sequentially) the cloud intensity at various selected points along the area of the cloud spread.

The present invention modifies the technique above described to the extent of causing the scanning antenna to partake of movement about more than one axis as it traverses its scanning cycle; there is produced by this novel technique a multiplicity of informative echo pulses returning from points in the cloud mass that are all of constant height above the curving earth's surface, even though of diverse spacing both in azimuth and in range; so that in a single rotational cycle of the antenna there is obtained, in one operation, a single level, cross-sectional type of panoramic report of the cloud mass characteristics, comparable to what has heretofore been obtainable only after correlating results reported in multiple, sequentially occurring, antenna scans.

Figure 1:
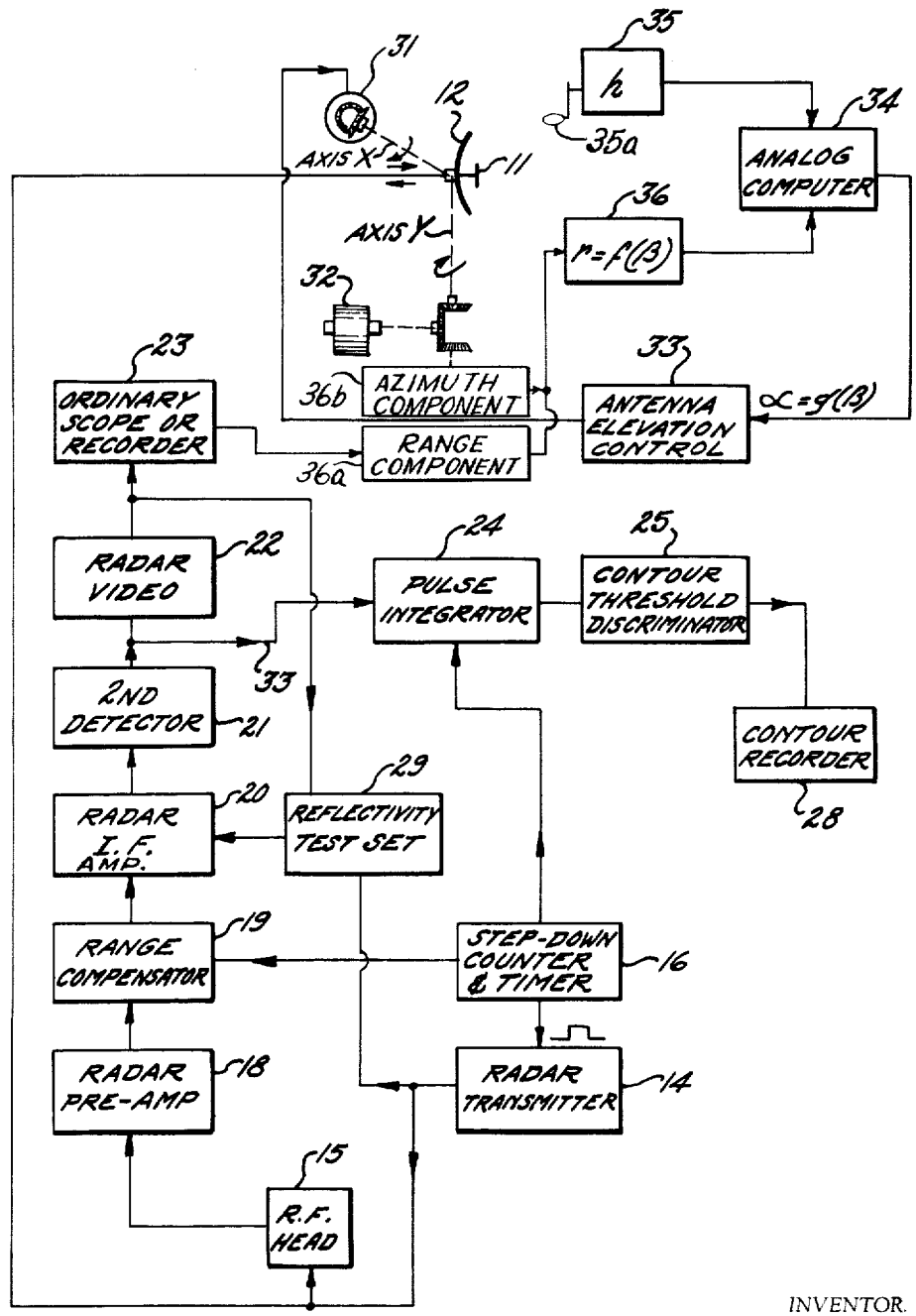
FIG. 1 is a block diagram of apparatus facilitating practice of, and embodying, the invention.

In applying the invention to the function of determining the density of a cloud formation directly above a fixed point of observation, the antenna 11 and parabolic reflector 12 (FIG. 1) may serve (in conjunction with transmitter 14) as radiating and receiving means for the transmission of radiant energy, in pulse form, and the reception of so much of the pulse energy as is reflected back by the moisture content of the overlying cloud bank; as explained more fully in prior patents of David Atlas, Nos. 2,656,531 and 3,039,088, the received echo goes through the R.F. (Radio Frequency) head 15 and through the I.F. pre-amplifier 18. The range compensator 19 deamplifies the signal voltages inversely as the range from which the were received so that its output is a function only of the actual reflectivity in the cloud pulse volume (neglecting atmospheric attenuation and variations in overall system sensitivity). As already mentioned, the range compensator 19 may be inserted almost anywhere in the chain of amplification provided only that no non-linear amplification occurs before range compensation. The compensator may also be incorporated in the output of the contour threshold discriminator 25 to modify the threshold printing levels for the reflectivity contours according to their range. The output of the range compensator 19 goes through the I.F. amplifier 20 and the second detector 21 from where said output is directed to the final video stage 22 (feeding recorder 23) or to a conventional PPI radar scope through suitable interposed components. The counter-timer 16, pulse integrator 24, contour recorder 28 and reflectivity test set 29 perform functions described as assigned to the correspondingly numbered elements of the above identified Atlas Patent No. 3,039,088.

The only device known to the inventor that is capable of accomplishing virtually the same result is the CAPPI system (Constant Altitude Plan Position Indication). The CAPPI system can present displays of extensive target echoes along surfaces of pre-selected altitudes above the earth, by appropriate electronic synthesis of annular range rings stored during 18 consecutive azimuth rotations, each rotation at an elevation angle increment in excess of the previous rotation. The CAPPI system can handle targets distributed along a wide range interval at any particular azimuth; thus it is especially well suited to the display of extensive weather echo patterns of the type found in association with extra-tropical cyclones and hurricanes.

However, for the presentation of squall-line echoes, the invention described herein has several advantages over the CAPPI system:

(a) *Speed.*—The information at any one specified height is obtained in one rotation of the antenna (as opposed to 18 scans required by the CAPPI system). This is of prime importance in the study of rapidly-changing thunderstorm echoes which comprise the squall line.

(b) *Immediate presentation.*—There is no delay between data acquisition and presentation. In the CAPPI system however, the minimum delay is 3.6 minutes (the time necessary for 18 antenna rotations).

(c) *Echo continuity.*—Along a line of targets which varies in range, the elevation angle will be caused to change in a continuous manner. No discontinuities will be introduced by the system, in contrast to the CAPPI scan where elevation-angle changes are discontinuous, resulting in echo discontinuities at particular values of range.

(d) *Versatility.*—The entire range of antenna elevation angles at the disposal of the radar may be used, but with CAPPI only 18 discrete steps of elevation angle are used. Thus the device described herein will permit greater height accuracy at large ranges and will allow the use of ranges down to a minimum equal to the desired height level (assuming the maximum antenna elevation angle is 90°, as in the AN/CPS-9 radar).

(e) *Economy.*—No storage and synthesis of data is required, so it is expected that the cost of production and maintenance of the device described herein will be significantly lower than the CAPPI system.

Figure 3:
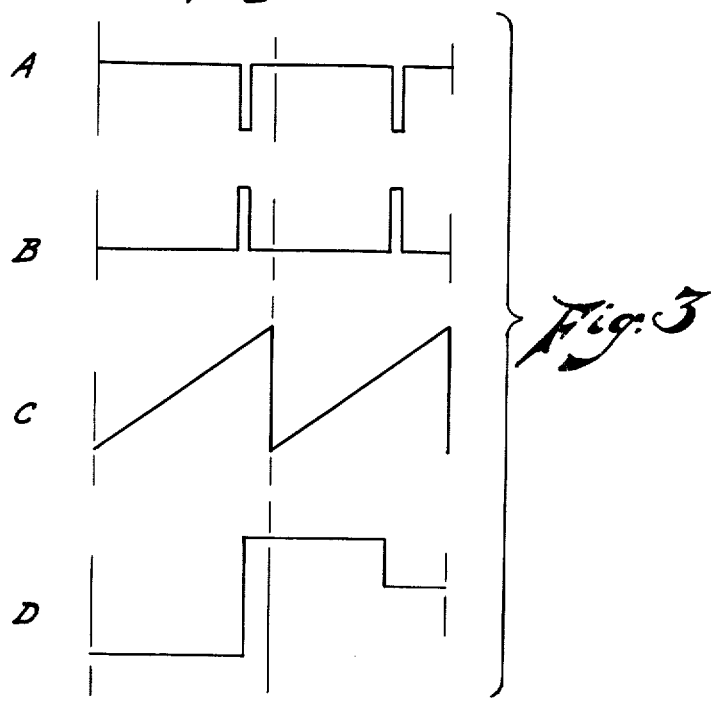
FIG. 3 is a group of waveform representations indicative of the respective outputs of the four components of FIG. 2.

The above described objectives of the invention are accomplished (*a*) by providing two motors 31 and 32, the former to produce a rocking or tilting of the antenna as it is rotated in azimuth by motor 32; and (b) by feeding control signals into the energizing circuit 33 of motor 31, to control the antenna rocking or tilting and thus cause the antenna elevation angle to follow the elevation pattern dictated by the shifting range pattern, as said pattern is recorded at the radar scope or recorder 23, and as transmitted from there to motor 31 by way of an analog computer 34 and control circuit 33. The computer 34 requires two inputs: the desired scanning height, and a description of the line to be scanned in terms of range as a function of azimuth angle or $r=f(\beta)$. The output is a signal which causes the antenna elevation angle to change with azimuth angle in such a manner as to scan across the line at the desired height. The functions of the components are illustrated symbolically in FIG. 3. The following terminology is used:

$h$ = height (thousands of feet)
$r$ = range (nautical miles)
$\alpha$ = antenna elevation angle
$\beta$ = antenna azimuth angle The basic equation relating $h$, $r$, and $\alpha$ is $$h = r \sin \alpha + Cr^2 \quad (1)$$

where C is a constant for any given scanning cycle, and is based on the earth's surface curvature and the height level (above the earth's surface) that is selected for said given scanning cycle. A voltage value representative of such selected height level is set into circuit 35 by means of hand-wheel 35a.

Figure 2:
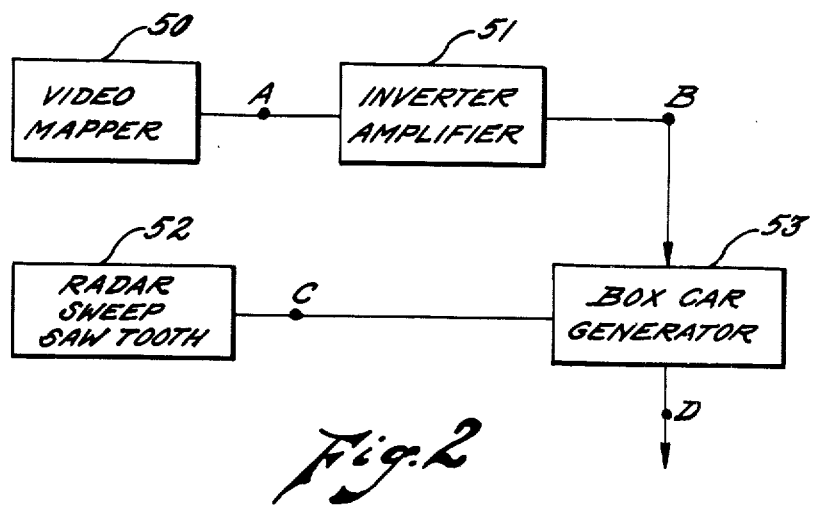
FIG. 2 is a block diagram of components cooperating to generate a suitable range voltage for input to the analog computer unit of FIG. 1.

Input 1 (desired height) as represented by box 35 in FIG. 1, can be in the form of a simple potentiometer. Input 2 could utilize any well-known electro-optical or electro-mechanical device such as a video mapper or combined range and azimuth cursor. For example, if a video mapper is used, the radar operator would view the echo pattern at some constant elevation angle, and then trace the desired line in grease-pencil on a clear plastic overlay. He would then transfer this overlay to a video mapper. FIG. 2 shows one of several possible means of obtaining the proper range voltage provided by block 36 which in turn receives range and azimuth information by way of range and azimuth components 36a and 36b, respectively. The negative video mapper pulse (waveform A) corresponding to the opaque grease-pencil line is inverted (waveform B) and used to trigger the box-car generator. The input to the box-car generator is the sawtooth radar sweep voltage (waveform C), which has an amplitude proportional to range. The output of the box-car generator (waveform D) remains at a constant voltage proportional to the range of the video mapper pulse until the time of the succeeding pulse, which may trigger the box-car generator at higher or lower value of sweep voltage, depending on an increase or decrease in range of the video mapper pulse. This relatively constant range voltage, varying only as the range of the selected line changes with azimuth angle, is fed to the analog computer, along with the preset height voltage, for generation of the proper elevation angle control voltage.

The analog computer, block 34 of FIG. 1, would solve Equation 1 continously as the antenna rotates in azimuth, and its output would be a continuously-varying voltage for controlling the antenna elevation angle as a function of antenna azimuth angle, or $\alpha = g(\beta)$. The analog computer is simply the inverse of a well-known and frequently-used device for creating the proper positioning of echoes on the RHI scope of a height-finding radar. The antenna elevation control, block 33 of FIG. 1, is an integral part of most radars designed for meteorological purposes.

Impossible solutions of Equation 1, for example, those having an input of height and range which would require an elevation angle beyond the capability of the antenna system, would be circumvented by designing the analog computer to read out the voltage corresponding to the limiting elevation angle whenever this limiting angle would be exceeded by Equation 1.

The most unique feature of the device described above is a means of controlling the antenna elevation angle of a PPI-scan radar in such a manner that targets located along a line will be scanned at a constant, pre-selected height. This scheme should be particularly valuable for observation of a squall line, but it would also find application in any situation where the width of the interesting part of an echo feature is small compared with the total variation in range of the echo feature over the entire PPI scope, as, for example, an outer rain band of a hurricane.

What I claim is:

The method of determining the characteristics of a long, relatively narrow weather pattern which includes the step of controlling the elevation angle of an azimuthally scanning antenna in accordance with the range variations observed in the content of the received signal energy returning to said antenna, and which further includes the step of computing desired elevation angle positions in accordance with two informational inputs, one being the selected scan height and the other the selected succession of range measurements corresponding to spaced distances along the line of the weather pattern under investigation.

References Cited by the Examiner

UNITED STATES PATENTS 3,127,604  3/64  Herriott _____ 343—5 X

CHESTER L. JUSTUS, *Primary Examiner.*